United States Patent
Kockmann et al.

(10) Patent No.: US 6,496,498 B1
(45) Date of Patent: Dec. 17, 2002

(54) METHOD AND SYSTEM FOR AVOIDING PERIODIC BURSTS OF INTERFERENCE IN WIRELESS COMMUNICATION BETWEEN A MOBILE UNIT AND A BASE UNIT

(75) Inventors: Juergen Kockmann, Austin; Uwe Sydon; Paulus Sastrodjojo, both of Round Rock, all of TX (US)

(73) Assignee: Siemens Information & Communication Mobile LLC, San Diego, CA (US)

(*) Notice: Subject to any disclaimer, the term of this patent is extended or adjusted under 35 U.S.C. 154(b) by 0 days.

(21) Appl. No.: 09/443,931

(22) Filed: Nov. 19, 1999

(51) Int. Cl.⁷ .................................................. H04B 7/28
(52) U.S. Cl. .................. 370/347; 455/296; 455/63; 455/67.1; 370/467; 370/468; 370/470
(58) Field of Search .............................. 455/67.1, 67.3, 455/63, 501, 119, 296, 461, 462, 550, 503, 67.6, 502, 343, 448, 13.2, 517, 522, 69, 572, 207–208; 370/465–468, 433, 337, 347, 350, 516, 470, 469

(56) References Cited

U.S. PATENT DOCUMENTS

| | | | | |
|---|---|---|---|---|
| 5,677,908 A | * | 10/1997 | Oura | 370/331 |
| 5,790,939 A | * | 8/1998 | Malcolm et al. | 370/324 |
| 5,822,314 A | * | 10/1998 | Chater-Lea | 370/337 |
| 6,035,199 A | * | 3/2000 | Barnett | 370/331 |
| 6,298,225 B1 | * | 10/2001 | Tat et al. | 455/130 |

* cited by examiner

Primary Examiner—Daniel Hunter
Assistant Examiner—Pablo Tran

(57) ABSTRACT

A method is provided for interfacing telecommunication devices. A base unit is connected to a landline for wireless communication. The base unit has a power supply operating at a power supply frequency. A mobile unit is provided for wireless communication with the base unit. The base unit is interfaced to the mobile unit using an interface protocol that has a plurality of frames. Each frame is for transmitting signals from the mobile unit to the base unit and from the base unit to the mobile unit. The frames have a specified frame length. An interference frequency is detected at either the base unit or the mobile unit. The interference frequency is compared with the power supply frequency. The frames are synchronized with the power supply and the specified frame length is adjusted based on the power supply frequency when the interference frequency and the power supply frequency are substantially the same.

16 Claims, 3 Drawing Sheets

METHOD AND SYSTEM FOR AVOIDING PERIODIC BURSTS OF INTERFERENCE IN WIRELESS COMMUNICATION BETWEEN A MOBILE UNIT AND A BASE UNIT

RELATED APPLICATIONS

This application is related to the following co-pending Applications all filed on Nov. 19, 1999:

Serial No. 09/443,939, entitled System and Method for Wireless Communication Incorporating Error Concealment;

Ser. No. 09/443,999, entitled System and Method for Simultaneously Testing Multiple Cordless Telephones;

Ser. No. 09/444,033, entitled System and Method for Testing An Assembled Telephone;

Ser. No. 09/444,058, entitled System and Method for Wireless Communication Incorporating Range Warning;

Ser. No. 09/443,968, entitled Method and System for Wireless Telecommunication Between A Mobile Unit and A Base Unit;

Ser. No. 09/444,028, entitled Method and System for Power-Conserving Interference Avoidance in Communication Between A Mobile Unit and A Base Unit In A Wireless Telecommunication System;

Ser. No. 09/444,008, entitled Method and System for Changing States In A Wireless Telecommunication System;

Ser. No. 09/443,933, entitled Method and System for Wireless Communication Incorporating Distinct System Identifier Bytes to Preserve Multi-frame Synchronization for Systems with Limited Control Channel Bandwidth;

Ser. No. 09/443,972, entitled System and Method for Wireless Communication Incorporating Synchronization Concept for 2.4 Ghz Direct Sequence Spread Spectrum Cordless Telephone System;

Ser. No. 09/443,166, entitled System And Method For Wireless Communication Incorporating Overloading Prevention Techniques for Multi-frame-synchronized Systems;

Ser. No. 09/443,998, entitled System and Method for Wireless Communication Incorporating Preloaded Response Message;

Ser. No. 09/443,972, entitled Method and System for a Wireless Communication System Incorporating Channel Selection Algorithm for 2.4 Ghz Direct Sequence Spread Spectrum Cordless Telephone System;

Ser. No. 09,443,997, entitled Method and System for Transmitting and Receiving Caller Id Data in a Wireless Telephone System;

Ser. No. 09/443,937, entitled Method and System for Prioritization of Control Messages In A Wireless Telephone System;

Ser. No. 09/443,996, entitled Method and System for Wireless Telecommunications Using a Multiframe Control Message;

Ser. No. 09/443,936, entitled Method and System for Transmitting Caller Id Information from a Base Station to a Mobile Unit Outside the Context of an Incoming Call; and Ser. No. 09/443,942, entitled Method and System for Data Compression.

TECHNICAL FIELD OF THE INVENTION

This invention relates generally to the field of telecommunications and, more specifically, to a method and system for avoiding periodic bursts of interference in wireless communication between a mobile unit and a base unit.

BACKGROUND OF THE INVENTION

As society grows more complex and operates at an ever accelerating pace, there has been a growing need for better and more flexible communication devices. One area that has experienced substantial development activity is the area of wireless communication. Wireless telephone systems are also known as portable, cordless or mobile telephone systems. A typical wireless communication system has a base station located at a customer's or user's premises. The base is connected to the Public Switched Telephone Network (PSTN) over a wireline interface and communicates with a mobile unit or handset over an air interface that permits the user to communicate remotely from the base station. While users desire the freedom and flexibility afforded by mobile wireless communications systems, they typically do not want to sacrifice the numerous features, such as caller ID, that are available through the wireline service over the PSTN. In addition, users of wireless systems increasingly demand a voice quality that is as good as the voice quality available over a wireline link.

In the past, the enhanced features and high voice quality demanded by users have been achieved by the use of sophisticated and complex algorithms and methods that require substantial processor resources and large amounts of memory. These processing and memory resources are not only expensive but also place a substantial drain on battery power, therefore shortening the effective use of the mobile unit. Other technical problems associated with the need for using faster and more powerful processors include larger packaging to accommodate the larger-sized components and to dissipate the heat generated by such units. In the past, wireless systems have been large and bulky and have weighed more than what is satisfactory to many users.

While wireless communication devices and methods have provided an improvement over prior approaches in terms of features, voice quality, cost, packaging size and weight, the challenges in the field of wireless telecommunications have continued to increase with demands for more and better techniques having greater flexibility and adaptability.

Therefore, a need has arisen for a new method and system for avoiding periodic bursts of interference in wireless communication between a mobile unit and a base unit.

SUMMARY OF THE INVENTION

In accordance with the present invention, a method and system for interfacing a mobile unit and a base unit of a wireless communication system in the presence of a periodically bursted interferer are provided that substantially eliminate or reduce disadvantages and problems associated with previously developed systems and methods.

A method for interfacing telecommunication devices is disclosed. A base unit is connected to a landline for wireless communication. The base unit has a power supply operating at a power supply frequency. A mobile unit is provided for wireless communication with the base unit. The base unit is interfaced to the mobile unit using an interface protocol that has a plurality of frames. Each frame is for transmitting signals from the mobile unit to the base unit and from the base unit to the mobile unit. The frames have a specified frame length. An interference frequency is detected at either the base unit or the mobile unit. The interference frequency is compared with the power supply frequency. The frames are synchronized with the power supply and the specified frame length is adjusted based on the power supply frequency when the interference frequency and the power supply frequency are substantially the same.

Technical advantages of the present invention include providing for interfacing a mobile unit and a base unit in the presence of a periodically bursted interferer. In particular, the interference frequency of the interferer is compared to the power supply frequency for the base unit. Accordingly, the system is able to determine that the interference is due to a periodically bursted interferer. As a result, the frame length of frames for communicating data between the units may be adjusted in accordance with the power supply frequency such that the interference is avoided.

Other technical advantages of the present invention will be readily apparent to one skilled in the art from the following figures, descriptions and claims.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 5 of the drawings, like numerals being used for like and corresponding parts of the various drawings.

Figure 1:
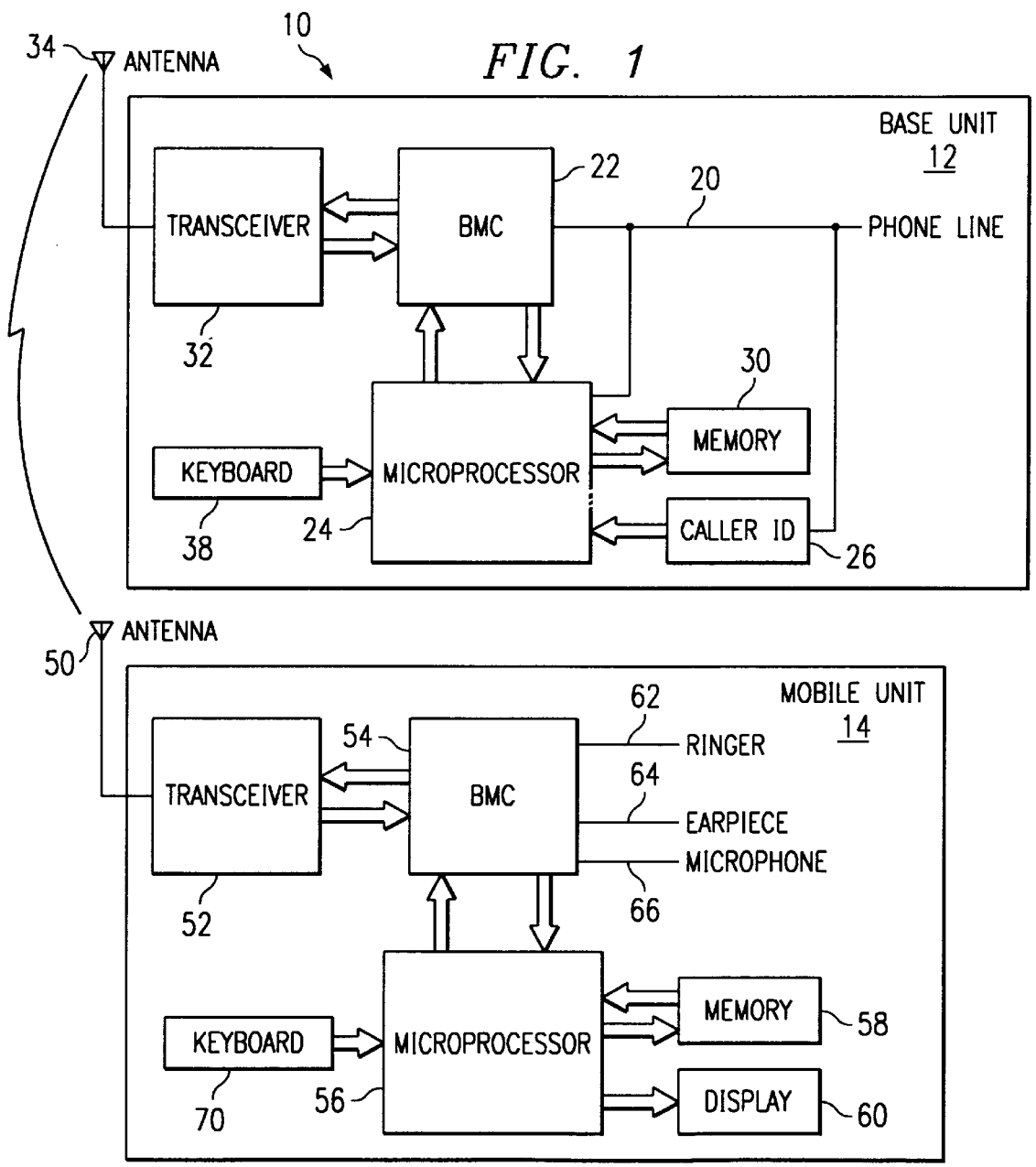
FIG. 1 is a block diagram illustrating a wireless telecommunication system including a base unit and a mobile unit constructed in accordance with the teachings of the present invention.

FIG. 1 is a block diagram illustrating a telecommunication system 10 including a base unit 12 and a mobile unit 14. The base unit 12 and the mobile unit 14 communicate with each other at a frequency in the industrial/scientific/medical (ISM) band. For example, the units 12 and 14 may communicate in the range of 2400 to 2483.5 MHz. It will be understood, however, that the base unit 12 and the mobile unit 14 may communicate with each other at other suitable frequencies without departing from the scope of the present invention.

The telecommunication system 10 illustrated in FIG. 1 is a wireless or cordless telephone system. In this exemplary embodiment, the mobile unit 14 comprises a mobile handset that communicates with the base unit 12 over discreet radio frequency channels. Although the telecommunication system 10 is illustrated as a cordless telephone system, it will be understood that the telecommunication system 10 may comprise any suitable type of wireless communication system. For example, the telecommunication system 10 may comprise a cellular telephone system, Local Multiple Distribution Service, and the like, without departing from the scope of the present invention.

In accordance with the exemplary embodiment shown in FIG. 1, the base unit 12 comprises a phone line 20 that is coupled to the Public Switched Telephone Network over a landline for receiving and transmitting voice or other data. For an incoming telephone call, data from the phone line 20 is passed to a microprocessor 24 and a caller ID interface 26. The caller ID interface 26 extracts caller ID information, such as a name and a telephone number associated with the originator of the telephone call, from the data on the phone line 20 and passes it to the microprocessor 24. The microprocessor 24 communicates with an internal memory 30 while processing the data received from the phone line 20 and the caller ID interface 26.

The microprocessor 24 then communicates the processed data from the phone line 20 and the caller ID interface 26, along with any additional data that needs to be transmitted to the mobile unit 14, to a burst mode controller (BMC) 22. The BMC 22 also receives data directly from the phone line 20, which is processed along with the data from the microprocessor 24. For example, the BMC 22 packages voice data from the phone line 20 with additional data from. the microprocessor 24 into one frame structure. The BMC 22 also communicates the data to a transceiver 32 which transmits a signal through an antenna 34 to the mobile unit 14. The base unit 12 also comprises a keyboard 38 for inputting data to the microprocessor 24. The keyboard 38 may comprise a numeric keypad for entering a telephone number or other data. The keyboard 38 may also comprise a pager button for paging the mobile unit 14 such that the mobile unit 14 provides a sound for locating the mobile unit 14.

The mobile unit 14 receives the signal from the base unit 12 through an antenna 50 which passes the data to a transceiver 52. The transceiver 52 processes the data and it to a BMC 54, which unpackages the data and communicates with a microprocessor 56. The microprocessor 56 communicates with an internal memory 58 and sends data to a display 60, such as an LCD or LED. For example, the microprocessor 56 may send to the display 60 a name and a telephone number extracted by the caller ID interface 26 in the base unit 12.

The BMC 54 also sends a signal to a ringer 62 to notify a user of an incoming call. After the user responds by activating the mobile unit 14, the BMC 54 sends the voice data received from the base unit 12 to an earpiece 64. After the connection is completed, voice data for transmission to the phone line 20 through the base unit 12 is received by the BMC 54 from the microphone 66. This data is transmitted from the mobile unit 14 to the base unit 12 in a similar manner to the transmission of data from the phone line 20 to the earpiece 64. The mobile unit 14 also comprises a keyboard 70 for a user to enter information for communication to the microprocessor 56. This keyboard 70 may be, for example, a numeric keypad on a mobile telephone handset for entering a telephone number.

The same process is also used for an outgoing telephone call, beginning with the activation of the mobile unit 14, which sends a signal through the BMC 54 to the transceiver 52 and from the transceiver 52 to the antenna 50. From the antenna 50 of the mobile unit 14 the signal is transmitted to the antenna 34 of the base unit 12, which passes the signal to the transceiver 32. The transceiver 32 passes the signal through the BMC 22 to the phone line 20. The telephone number being called, voice and other data is then communicated back and forth between the mobile unit 14 and the base unit 12 as previously described.

The microprocessors 24 and 56 each comprise an air interface that includes an interface protocol for interfacing the base unit 12 and the mobile unit 14. The interface protocol includes a plurality of consecutive frames for providing communication between the base unit 12 and the mobile unit 14, as described in more detail below in connection with FIG. 2.

Figure 2:
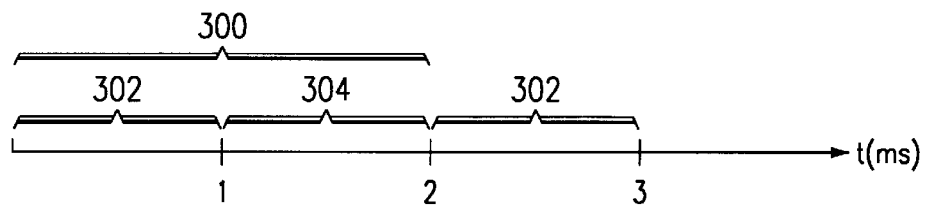
FIG. 2 is a timeline illustrating the length of a frame for communication between the mobile unit and the base unit of FIG. 1, including a master sub-frame for transmission from the mobile unit and a slave sub-frame for transmission from the base unit, in accordance with one embodiment of the present invention.

FIG. 2 is a timeline illustrating the length of a frame 300 in accordance with one embodiment of the present invention. According to this embodiment, the frame 300 has a frame length of two milliseconds. This two-millisecond frame 300 is sub-divided into a one-millisecond master sub-frame 302 and a one-millisecond slave sub-frame 304. The master sub-frame 302 is that portion of the frame 300 during which the mobile unit 14 transmits a signal to the base unit 12 and the base unit 12 receives the signal from the mobile unit 14. Similarly, the slave sub-frame 304 is that part of the frame 300 during which the base unit 12 transmits a signal to the mobile unit 14 and the mobile unit 14 receives the signal from the base unit 12.

According to the embodiment shown in FIG. 2, each frame 300 is followed by a consecutive frame 300 such that a plurality of consecutive frames 300 provides alternating master sub-frames 302 and slave sub-frames 304. Thus, during active communication between the base unit 12 and the mobile unit 14, each master sub-frame 302 is followed by a slave sub-frame 304 which is followed by another master sub-frame 302 and so on. These alternating sub-frames 302 and 304 continue indefinitely while the base unit 12 and the mobile unit 14 are actively communicating.

Figure 3:
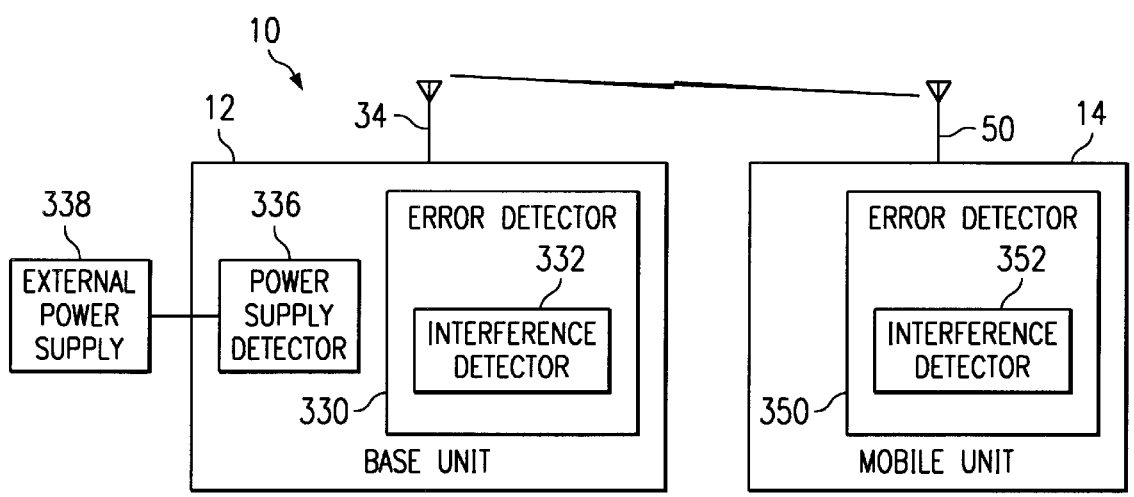
FIG. 3 is a block diagram illustrating a system for interfacing the base unit and the mobile unit of FIG. 1 in accordance with one embodiment of the present invention.

FIG. 3 is a block diagram of one embodiment of the telecommunication system 10 of FIG. 1 including a system for interfacing the base unit 12 and the mobile unit 14. The base unit 12 has an error detector 330 that includes an interference detector 332 for detecting interference that affects communication between the units 12 and 14. The base unit 12 also has a power supply detector 336 for detecting the frequency of an external power supply 338. The mobile unit 14 also comprises an error detector 350 that includes an interference detector 352.

Figure 4:
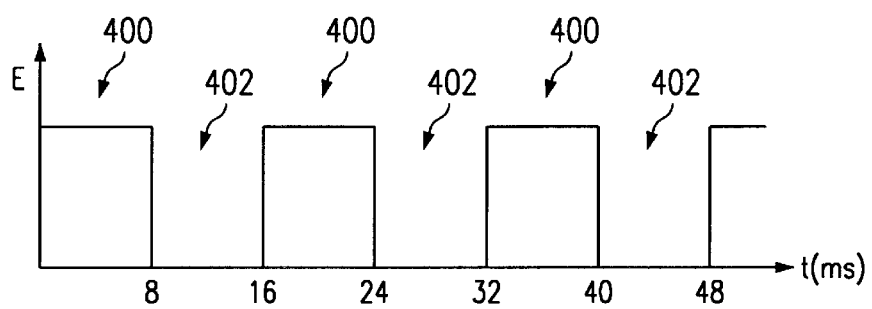
FIG. 4 is a graph of energy versus time for a periodically bursted interferer that may interfere with communication between the base unit and the mobile unit of FIG. 1.

FIG. 4 is a graph of energy versus time for a periodically bursted interferer that may interfere with communication between the base unit 12 and the mobile unit 14. This interference may come from any device operating in the ISM band. For example, a microwave oven may act as a periodically bursted interferer when operating in the presence of a base unit 12 or a mobile unit 14. A periodically bursted interferer, as shown in FIG. 4, alternates between high energy levels 400 and low energy levels 402 at a specific frequency. For the embodiment shown in FIG. 4, the periodically bursted interferer is operating at 60 Hz, which is the standard power frequency available from power outlets in the United States. For this frequency, the periodically bursted interferer alternates between high energy levels 400 and low energy levels 402 approximately every 8 milliseconds. It will be understood, however, that the periodically bursted interferer may operate at any suitable frequency, such as at the 50-Hz European standard, without departing from the scope of the present invention.

In operation, the error detector 330 detects an error because of interference from a periodically bursted interferer in the presence of the base unit 12. The interference detector 332 determines that the error detected by the error detector 330 is due to interference, as opposed to another unidentified cause. The interference detector 332 determines whether the periodically bursted interferer is receiving power from the same type of power supply as the base unit 12 by comparing the interference frequency to the frequency of the external power supply 338 as detected by the power supply detector 336. If the frequencies are the same, the frame length of the frames 300 is adjusted to correspond to the power supply frequency. Thus, the frame length of each frame 300 is adjusted from two milliseconds to 16 milliseconds for the embodiment in which the periodically bursted interferer is operating at 60 Hz.

Additionally, the frames 300 are synchronized with the external power supply 338, and thus with the interferer, such that the base unit 12 transmits signals to the mobile unit 14 while the interferer is producing high energy levels 400, and the base unit 12 receives signals from the mobile unit 14 while the interferer is producing low energy levels 402. Thus, the high energy levels 400 in this embodiment correspond to the slave sub-frame 304 and the low energy levels 402 correspond to the master sub-frame 302. In this way, the interference from the periodically bursted interferer is avoided. The frame length continues to be 16 milliseconds until the interference detector 332 no longer detects interference from the periodically bursted interferer. At this point, the frame length is adjusted to the original frame length of two milliseconds.

For a periodically bursted interferer in the presence of the mobile unit 14, the error detector 350 detects an error. The interference detector 352 determines that the error detected by the error detector 350 is due to interference, as opposed to another unidentified cause. The interference detector 352 determines whether the periodically bursted interferer is receiving power from the same type of power supply as the base unit 12. This is accomplished by comparing the interference frequency to the frequency of the external power supply 338 as detected by the power supply detector 336, which is communicated by the base unit 12 to the mobile unit 14. If the frequencies are the same, the frame length of the frames 300 is adjusted to correspond to the power supply frequency. Thus, the frame length of each frame 300 is adjusted from two milliseconds to 16 milliseconds for the embodiment in which the periodically bursted interferer is operating at 60 Hz.

Additionally, the frames 300 are synchronized with the external power supply 338, and thus with the interferer, such that the mobile unit 14 transmits signals to the base unit 12 while the interferer is producing high energy levels 400, and the mobile unit 14 receives signals from the base unit 12 while the interferer is producing low energy levels 402. Thus, the high energy levels 400 in this embodiment correspond to the master sub-frame 302 and the low energy levels 402 correspond to the slave sub-frame 304. In this way, the interference from the periodically bursted interferer is avoided. The frame length continues to be 16 milliseconds until the interference detector 352 no longer detects interference from the periodically bursted interferer. At this point, the frame length is adjusted to the original frame length of two milliseconds.

In general, the periodically bursted interferer and the external power supply 338 operate at the same frequency. In this situation, the sub-frames 302 and 304 may be correctly synchronized with the energy levels 400 and 402 based on the timing and the frequency of the signal from the external power supply 338, which corresponds to a power supply to the periodically bursted interferer.

Figure 5:
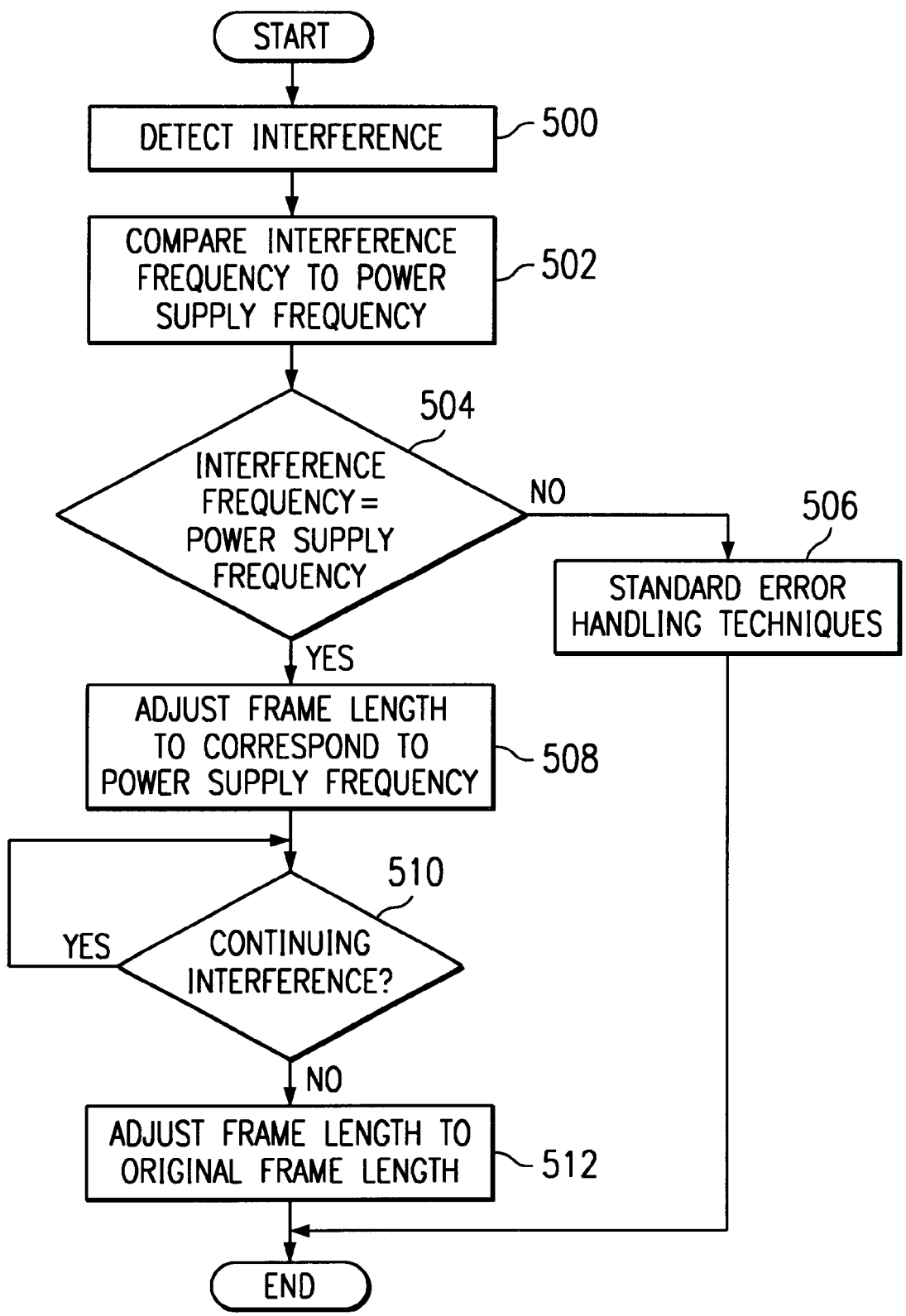
FIG. 5 is a flow diagram demonstrating one method for interfacing the base unit and the mobile unit of FIG. 1 in the presence of a periodically bursted interferer.

FIG. 5 is a flow diagram demonstrating one method for interfacing the base unit 12 and the mobile unit 14 in the presence of a periodically bursted interferer. The method begins at Step 500 where the interference detector 332 detects interference with the communication between the base unit 12 and the mobile unit 14. At Step 502, an interference frequency associated with the interference is detected by the interference detector 332 and compared to a power supply frequency detected by the power supply detector 336.

At decisional Step 504, the interference detector 332 determines whether the interference frequency and the power supply frequency are the same. If the interference frequency and the power supply frequency are determined not to be the same, the method follows the No branch from decisional Step 504 to Step 506 where standard error handling techniques are used by the error detector 330 to overcome the detected error. However, if the interference frequency and the power supply frequency are determined to be the same, the method follows the Yes branch from decisional Step 504 to Step 508 where the frame length is adjusted to correspond to the power supply frequency and, thus, to the interference frequency as well.

At decisional Step 510, the interference detector 332 determines whether there is continuing interference from the periodically bursted interferer. If there is continuing interference, the method follows the Yes branch from decisional Step 510 and remains at decisional Step 510 such that the frame length continues to correspond to the power supply frequency. However, if the interference no longer exists, the method follows the No branch from decisional Step 510 to Step 512 where the frame length is adjusted to the original frame length, at which point the method ends.

While the invention has been particularly shown and described by the foregoing detailed description, it will be understood by those skilled in the art that various other changes in form and detail may be made without departing from the spirit and scope of the invention.

What is claimed is:

1. A method for interfacing telecommunication devices, comprising:
    providing a base unit coupled to a landline for wireless communication, the base unit having a power supply operating at a power supply frequency;
    providing a mobile unit for wireless communication with the base unit;
    interfacing the base unit to the mobile unit using an interface protocol having a plurality of frames, each frame for transmitting signals from the mobile unit to the base unit and from the base unit to the mobile unit, the frames having a specified frame length;
    detecting an interference frequency at either the base unit or the mobile unit;
    comparing the interference frequency with the power supply frequency; and
    synchronizing the frames with the power supply and adjusting the specified frame length based on the power supply frequency when the interference frequency and the power supply frequency are substantially the same.

2. The method of claim 1, synchronizing the frames with the power supply and adjusting the specified frame length comprising receiving signals from the mobile unit at the base unit while the interference frequency is providing a low energy level when the interference frequency is detected at the base unit.

3. The method of claim 1, synchronizing the frames with the power supply and adjusting the specified frame length comprising transmitting signals from the base unit to the mobile unit while the interference frequency is providing a high energy level when the interference frequency is detected at the base unit.

4. The method of claim 1, synchronizing the frames with the power supply and adjusting the specified frame length comprising receiving signals from the base unit at the mobile unit while the interference frequency is providing a low energy level when the interference frequency is detected at the mobile unit.

5. The method of claim 1, synchronizing the frames with the power supply and adjusting the specified frame length comprising transmitting signals from the mobile unit to the base unit while the interference frequency is providing a high energy level when the interference frequency is detected at the mobile unit.

6. The method of claim 1, further comprising adjusting the specified frame length based on the interface protocol when the interference frequency is no longer detected.

7. The method of claim 1, the power supply frequency and the interference frequency comprising 60 Hertz, adjusting the specified frame length based on the power supply frequency comprising adjusting the specified frame length to 16 milliseconds.

8. The method of claim 1, the power supply frequency and the interference frequency comprising 50 Hertz, adjusting the specified frame length based on the power supply frequency comprising adjusting the specified frame length to 20 milliseconds.

9. A system for interfacing telecommunication devices, comprising:
    a base unit coupled to a landline for wireless communication, the base unit having a power supply operating at a power supply frequency; a mobile unit for wireless communication with the base unit;
    an interface for interfacing the base unit to the mobile unit, the interface using an interface protocol having a plurality of frames, each frame for transmitting signals from the mobile unit to the base unit and from the base unit to the mobile unit, the frames having a specified frame length;
    an error detector having an interference detector for detecting an interference frequency at either the base unit or the mobile unit and for comparing the interference frequency with the power supply frequency, the error detector for synchronizing the frames with the power supply and adjusting the specified frame length based on the power supply frequency when the interference frequency and the power supply frequency are substantially the same.

10. The system of claim 9, synchronizing the frames with the power supply and adjusting the specified frame length comprising receiving signals from the mobile unit at the base unit while the interference frequency is providing a low energy level when the interference frequency is detected at the base unit.

11. The system of claim 9, synchronizing the frames with the power supply and adjusting the specified frame length comprising transmitting signals from the base unit to the mobile unit while the interference frequency is providing a high energy level when the interference frequency is detected at the base unit.

12. The system of claim 9, synchronizing the frames with the power supply and adjusting the specified frame length comprising receiving signals from the base unit at the mobile unit while the interference frequency is providing a low energy level when the interference frequency is detected at the mobile unit.

13. The system of claim 9, synchronizing the frames with the power supply and adjusting the specified frame length comprising transmitting signals from the mobile unit to the base unit while the interference frequency is providing a high energy level when the interference frequency is detected at the mobile unit.

14. The system of claim 9, the error detector also for adjusting the specified frame length based on the interface protocol when the interference detector no longer detects interference.

15. The system of claim 9, the power supply frequency and the interference frequency comprising 60 Hertz, the error detector for adjusting the specified frame length to 16 milliseconds.

16. The system of claim 9, the power supply frequency and the interference frequency comprising 50 Hertz, the error detector for adjusting the specified frame length to 20 milliseconds.

* * * * *